United States Patent [19]

Watanabe

[11] 4,156,345
[45] May 29, 1979

[54] SECONDARY AIR FEED CONTROL DEVICE

[75] Inventor: Noboru Watanabe, Susono, Japan

[73] Assignee: Toyota Jidosha Kogyo Kabushiki Kaisha, Aichi, Japan

[21] Appl. No.: 849,762

[22] Filed: Nov. 9, 1977

[30] Foreign Application Priority Data

Jul. 25, 1977 [JP] Japan .................................. 52-88332

[51] Int. Cl.² .............................................. F01N 3/15
[52] U.S. Cl. ........................................ 60/276; 60/290
[58] Field of Search ......................... 60/276, 289, 290

[56] References Cited

U.S. PATENT DOCUMENTS

| 3,931,710 | 1/1976 | Hartel | 60/276 |
| 3,962,867 | 6/1976 | Ikeura | 60/276 |

Primary Examiner—Douglas Hart
Attorney, Agent, or Firm—Stevens, Davis, Miller & Mosher

[57] ABSTRACT

Disclosed is a secondary air feed control device comprising a movable valve and a movable valve seat having a first and a second valve port. The first valve port is connected to the secondary air inlet disposed in the exhaust pipe, while the second valve port is connected to the atmosphere. The movable valve is arranged between the first and second valve ports so as to co-operate with the first and second valve ports. An oxygen concentration detector, providing a detecting signal indicating that the total air-fuel ratio is smaller than the stoichiometric air-fuel ratio, is disposed in the exhaust pipe. The opening area of the first valve port is controlled so as to be increased in accordance with an increase in the level of the load of the engine and in response to the detecting signal when the total air-fuel ratio becomes smaller than the stoichiometric air-fuel ratio.

9 Claims, 2 Drawing Figures

SECONDARY AIR FEED CONTROL DEVICE

DESCRIPTION OF THE INVENTION

The present invention relates to a secondary air feed control device of an internal combustion engine.

As a method of simultaneously reducing the amount of harmful HC, CO and $NO_x$ components in the exhaust gas, there is known a method of using a three way catalyzer. As is known to those skilled in the art, the highest efficiency of purification can be obtained when the total air-fuel ratio becomes equal to the stoichiometric air-fuel ratio. (If the intake passage and the exhaust passage located upstream of the three way catalytic converter are defined as an air-fuel passage, the total air-fuel ratio is defined as the ratio of the amount of air fed into the air-fuel passage to the amount of fuel fed into the air-fuel passage.) Consequently, in a conventional engine equipped with such a three way catalytic converter, an oxygen concentration detector capable of detecting the total air-fuel ratio is disposed in the exhaust system of the engine, and a rich air-fuel mixture is fed into the cylinder of the engine. In addition, secondary air is fed into the exhaust system in response to the output signal of the oxygen concentration detector so that the total air-fuel ratio becomes equal to the stoichiometric air-fuel ratio. As a typical secondary air feed control device of this type, a secondary air feed control device has been known in which a secondary air feed control valve is disposed in the secondary air feed passage communicating the air pump with the secondary air feed port arranged in the exhaust system, the feeding of secondary air being so controlled that the secondary air feed control valve is fully opened to feed secondary air into the exhaust system when the total air-fuel ratio becomes smaller than the stoichiometric air-fuel ratio, while the secondary air feed control valve is completely closed to stop the feeding operation of the secondary air when the total air-fuel ratio becomes larger than the stoichiometric air-fuel ratio. However, in this secondary air feed control device, since a large amount of secondary air, which is excessively larger than the amount necessary to obtain the highest purifying efficiency, is fed into the exhaust system after the secondary air feed control valve is fully opened, the total air-fuel ratio becomes excessively large. On the other hand, since the feeding operation of secondary air remains stopped after the secondary air feed control valve is completely closed, the total air-fuel ratio becomes excessively small. As mentioned above, in a conventional secondary air feed control device, since the total air-fuel ratio fluctuates greatly, it is difficult to obtain the highest purifying efficiency of the three way catalytic converter. In addition, at the time when the level of the load of the engine is abruptly changed, for example, at the time of acceleration, it is necessary to feed a large amount of secondary air into the exhaust system. However, since a conventional secondary air feed control device cannot follow the abrupt change in the level of the load of the engine, and thus does not have good responsiveness to said abrupt change, it is impossible to appropriately control the amount of secondary air fed into the exhaust system.

An object of the present invention is to provide a secondary air feed control device capable of minimizing the fluctuation of the total air-fuel ratio by feeding an appropriate amount of secondary air into the exhaust system in accordance with a change in the level of the load of the engine.

According to the present invention, there is provided a secondary air feed control device of an internal combustion engine provided with a three way catalytic converter in an exhaust passage, said device comprising: means for detecting the total air-fuel ratio to provide a detecting signal indicating that the total air-fuel ratio is smaller than the stoichiometric air-fuel ratio; an air pump driven by the engine; a secondary air inlet opening into the exhaust passage located upstream of the three way catalytic converter; and valve means disposed in a secondary air passage communicating the air pump with the secondary air inlet for increasing the amount of the secondary air fed into the exhaust passage in accordance with an increase in the level of the load of the engine and in response to the detecting signal when the total air-fuel ratio becomes smaller than the stoichiometric air-fuel ratio.

The present invention may be more fully understood from the description set forth below of a preferred embodiment of the invention, together with the accompanying drawings.

DESCRIPTION OF A PREFERRED EMBODIMENT

Figure 1:
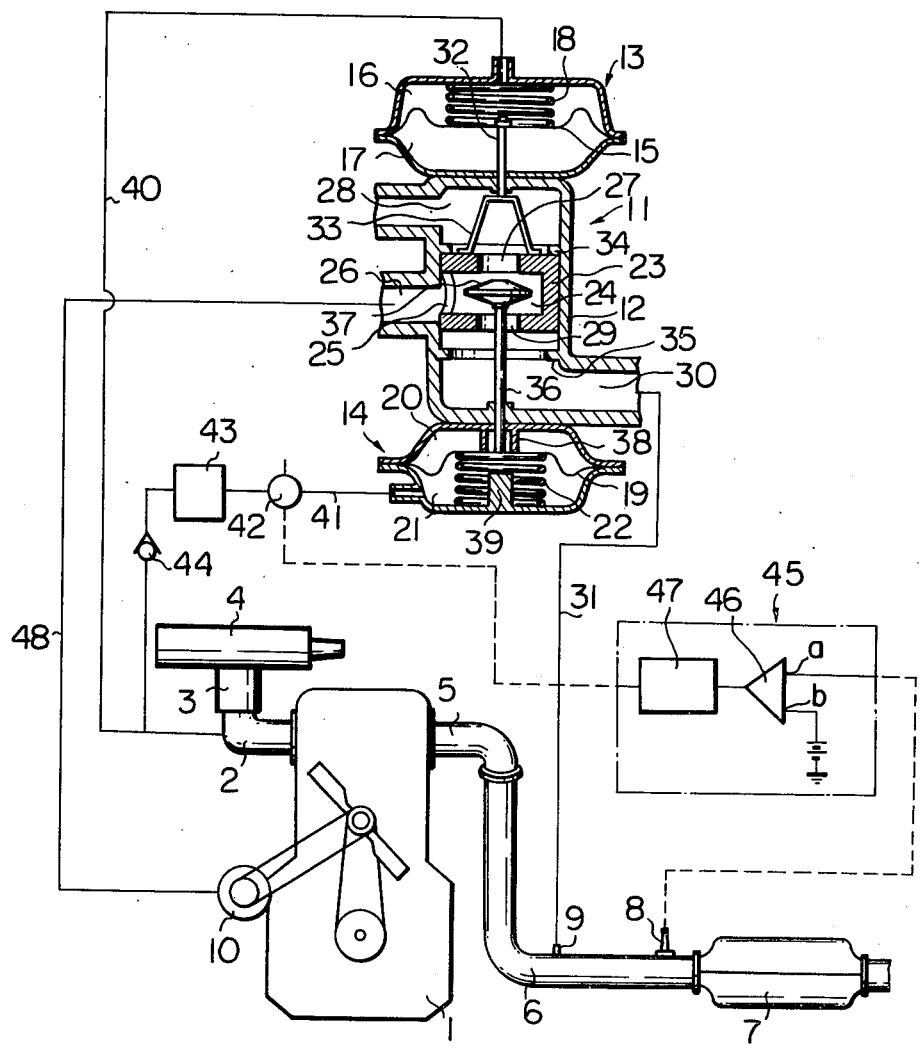
FIG. 1 is a general view of a secondary air feed control device according to the present invention.

Referring to FIG. 1, 1 designates an engine body, 2 an intake manifold, 3 a carburetor set so as to be able to always create a rich air-fuel mixture and 4 an air cleaner; 5 designates an exhaust manifold, 6 an exhaust pipe, 7 a three way catalytic converter, and 8 an oxygen concentration detector disposed in the exhaust pipe 6 located upstream of the three way catalytic converter 7; 9 designates a secondary air feed port arranged in the exhaust pipe 6 located upstream of the oxygen concentration detector 8, 10 an air pump driven by the engine and 11 a secondary air feed control valve. This secondary air feed control valve 11 has a pair of diaphragm apparatus 13 and 14 which are fixed onto the upper end and the lower end of a housing 12, respectively. The diaphragm apparatus 13 comprises a vacuum chamber 16 and an atmospheric pressure chamber 17 which are separated by a diaphragm 15. This diaphragm 15 is always biased downwards by the spring force of a compression spring 18. On the other hand, the diaphragm apparatus 14 comprises an atmospheric pressure chamber 20 and a vacuum chamber 21 which are separated by a diaphragm 19. This diaphragm 19 is always biased upwards by the spring force of a compression spring 22.

A hollow cylindrical valve seat member 23 is slidably inserted into the cylindrical bore of the housing 12. The valve seat member 23 has in its inside a valve chamber 24 which always opens into a secondary air feed port 26 via an opening 25 formed on the cylindrical circumferential wall of the valve seat member 23. A first valve port 27 is formed on the upper wall of the valve seat member 23 and, thus, the valve chamber 24 is always connected via the first valve port 27 to an upper chamber 28 which is, in turn, always connected to the atmosphere. On the other hand, a second valve port 29 is formed on the lower wall of the valve seat member 23 and, thus, the valve chamber 24 is connected via the second valve port 29 to a lower chamber 30 which is, in turn, connected to the secondary air feed port 9 via a secondary air conduit 31. A stay 33 is fixed onto the lower end of a control rod 33 fixed onto the diaphragm 15, and the valve seat member 23 is supported by the control rod 33 by means of the stay 33. A pair of stops 34 and 35 is formed on the inner wall of the housing 12 so that the valve seat member 23 reciprocally moves between the stops 34 and 35 in the housing 12 when the diaphragm 15 moves upwards or downwards. A valve head 37 connected to the diaphragm 19 by means of a valve rod 36 is arranged in the valve chamber 24 so as to face the valve ports 27 and 29. A pair of stops 38 and 39 fixed onto the inner wall of the housing of the diaphragm apparatus 14 is arranged in the atmospheric pressure chamber 20 and the vacuum chamber 21, respectively, so that the diaphragm 19 moves upwards and downwards between the stops 38 and 39.

The vaccum chamber 16 of the diaphragm apparatus 13 is connected via a vacuum conduit 40 to the intake manifold 2 located downstream of the throttle valve of the carburetor 3. Consequently, when the engine is operating under a light load, the vacuum level in the vacuum chamber 16 is large. As a result of this, the diaphragm 15 moves upwards and, thus, the valve seat member 23 abuts against the stop 34 as shown in FIG. 1. On the other hand, when the engine is operating under a heavy load, the vacuum level in the vacuum chamber 16 is small. As a result of this, the diaphragm 15 moves downwards due to the spring force of the compression spring 18 and, thus, the valve seat member 23 moves downwards until it abuts against the stop 35.

Figure 2:
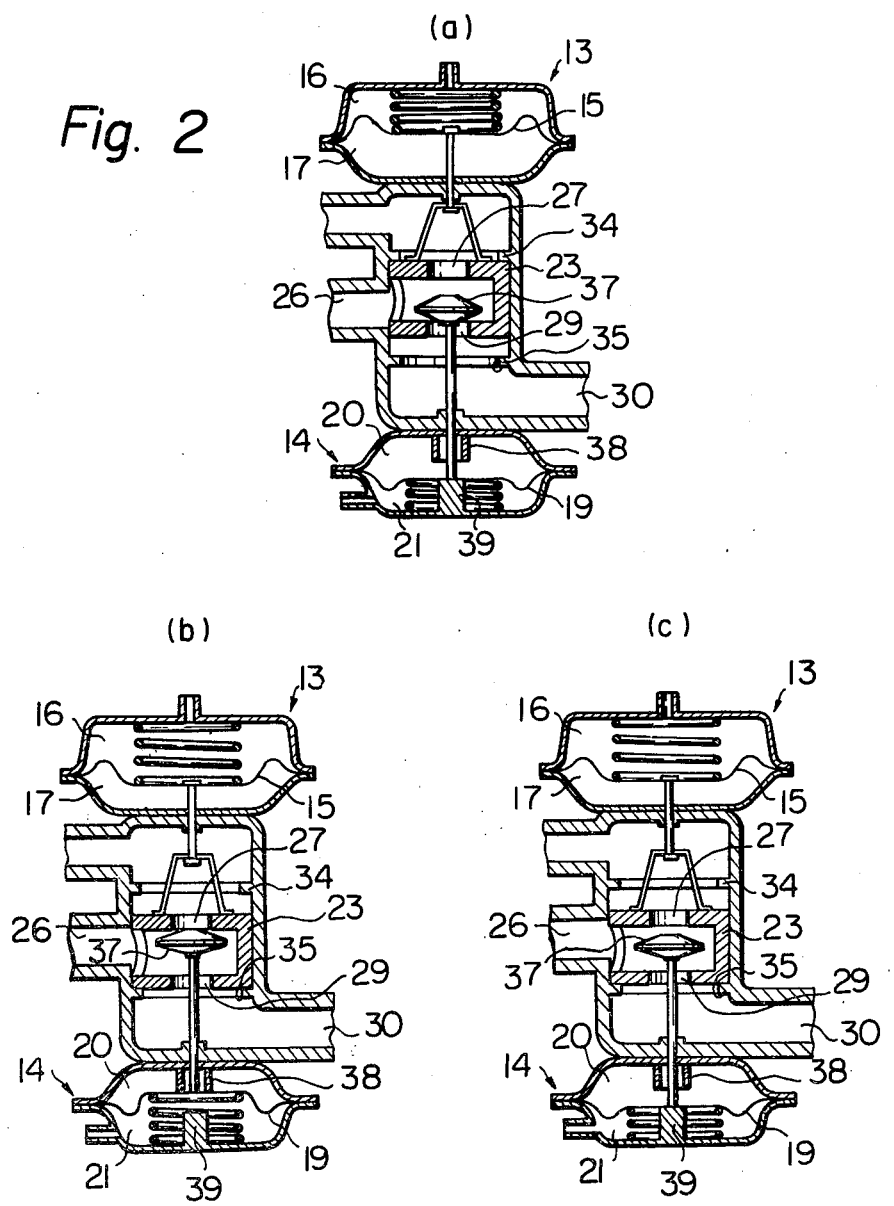
FIG. 2 is a view showing various operating conditions of the secondary air feed control valve shown in FIG. 1.

An electromagnetic switching valve 42, an accumulator 43 equipped with the pressure regulating valve (not shown), and a check valve 44 permitting the outflow of air from the accumulator 43 to the intake manifold 2 are disposed in a vacuum conduit 41 communicating the vacuum chamber 21 of the diaphragm apparatus 14 with the intake manifold 2. The inside of the accumulator 43 is always maintained at a constant vacuum level by the pressure regulating valve and the check valve 44. The electromagnetic switching valve 42 is operated on the basis of the output signal of an electronic control circuit 45 which is, in turn, operated based on the output signal of the oxygen concentration detector 8. As is known to those skilled in the art, the oxygen concentration detector 8 produces an output voltage of about 0.9 volt when the total air-fuel ratio is smaller than the stoichiometric air-fuel ratio, while the oxygen concentration detector 8 produces an output voltage of about 0.1 volt when the total air-fuel ratio is larger than the stoichiometric air-fuel ratio. The output voltage of the oxygen concentration detector 8 is applied to one of the input terminals a of a comparator 46 of the electronic control circuit 45, while a reference voltage is applied to the other input terminal b of the comparator 46. The comparator 46 is turned to the ON condition when the input voltage in the input terminal a is above, for example, 0.5 volt, that is, when the total air-fuel ratio is smaller than the stoichiometric air-fuel ratio. On the other hand, the comparator 46 is turned to the OFF condition when the input voltage in the input terminal a is below 0.5 volt, that is, when the total air-fuel ratio is larger than the stoichiometric air-fuel ratio. Consequently, when the total air-fuel ratio is smaller than the stoichiometric air-fuel ratio, that is, when the fuel is excessive, the output voltage of the comparator 46 is amplified by an amplifier 47 and, then, the output voltage thus amplified is applied to the electromagnetic switching valve 42. As a result of this, the vacuum chamber 21 of the diaphragm apparatus 14 is connected to the atmosphere via the electromagnetic switching valve 42 and, thus, the diaphragm 19 moves upwards until it abuts against the stop 38 as shown in FIG. 1. At this time, the opening area of the valve port 29 is increased to a great extent and, therefore, a large amount of secondary air is fed into the exhaust pipe 6 from the air pump 10 via a secondary air conduit 48, the valve chamber 24, the valve port 29, the secondary air conduit 31 and the secondary air feed port 9. On the other hand, when the total air-fuel ratio is larger than the stoichiometric air-fuel ratio, that is, when the air is excessive since the comparator 46 is turned to the OFF condition, the solenoid (not shown) of the electromagnetic switching valve 42 is de-energized. As a result of this, the vacuum chamber 21 of the diaphragm apparatus 14 is connected to the accumulator 43 via the electromagnetic switching valve 42. Therefore, since the vacuum is produced in the vacuum chamber 21, the diaphragm 19 moves downwards until it abuts against the stop 39 as shown in FIG. 2(a). At this time, since the opening area formed between the valve port 29 and the valve head 37 becomes quite small as shown in FIG. 2(a), a small amount of secondary air is fed into the exhaust pipe 6.

FIGS. 1 and 2(a) show the case wherein the engine is operating under a light load. On the other hand, when the engine is operating under a heavy load, since the vacuum level in the vacuum chamber 16 of the diaphragm apparatus 13 becomes small, the diaphragm 15 moves downwards. As a result of this, the valve seat member 23 moves downwards until it abuts against the stop 35 as shown in FIGS. 2(a) and 2(b). At this time, if the total air-fuel ratio is smaller than the stoichiometric air-fuel ratio, since atmospheric pressure is introduced into the vacuum chamber 21 of the diaphragm apparatus 14 via the electromagnetic switching valve 42, as mentioned above, the diaphragm 19 moves upwards until it abuts against the stop 38. At this time, as is shown in FIG. 2(b), the opening area formed between the valve head 37 and the valve port 29 becomes quite large as compared with the case when the engine is operating under a light load as shown in FIG. 1 and, as a result, a large amount of secondary air, which is considerably larger than the amount in the case shown in FIG. 1, is fed into the exhaust pipe 6. On the other hand, if the total air-fuel ratio becomes larger than the stoichiometric air-fuel ratio when the engine is operating under a heavy load, since the vacuum is produced in the vacuum chamber 21 of the diaphragm apparatus 14 as mentioned above, the diaphragm 19 moves downwards until it abuts against the stop 39. As a result of this, as is shown in FIG. 2(c), the opening area formed between the valve head 37 and the valve port 29 becomes small compared with the case shown in FIG. 2(b). However, said opening area is large compared with the case wherein the engine is operating under a light load as shown in FIG. 2(a).

As is shown in FIG. 2(a), even if the total air-fuel ratio becomes small when the engine is operating under a light load, the valve port 29 is maintained slightly open by means of the stop 39. As a result of this, since a small amount of secondary air is fed into the exhaust pipe 6, the total air-fuel ratio is prevented from becoming extremely small. On the other hand, even if the total air-fuel ratio becomes large when the engine is operating under a light load, the valve head 37 does not fully open the valve port 29, that is, the valve port 27 remains opened as shown in FIG. 1. Consequently, since a relatively small amount of secondary air is fed into the exhaust port 6, the total air-fuel ratio is prevented from becoming extremely large.

When the engine is operating under a heavy load, since the amount of air fed into the cylinder of the engine is increased, it is necessary to increase the amount of secondary air fed into the exhaust pipe 6. In order to increase the amount of secondary air fed into the exhaust pipe 6 when the engine is operating under a heavy load, the movable valve seat member 23 is provided, which is arranged so as to move downwards to increase the opening area formed between the valve port 29 and the valve head 37 when the engine is operating under a heavy load. As a result, the amount of secondary air fed into the exhaust pipe 6 is increased in accordance with the increase in the level of the load of the engine. In addition, when the level of the load of the engine is abruptly increased, for example, at the time of acceleration, the rapid downward movement of the valve seat member 23 causes a rapid increase in the opening area formed between the valve head 37 and the valve port 29. Consequently, even if the level of the load of the engine is abruptly changed, a desired amount of secondary air can be fed into the exhaust pipe 6.

According to the present invention, since the fluctuation of the total air-fuel ratio can be minimized, the purifying efficiency in the three way catalytic converter can be always maintained at the highest level. In addition, since a secondary air feed control valve according to the present invention has a good responsiveness to abrupt change in the level of the load of the engine, the purifying efficiency is further improved and, as a result, the amount of harmful CO, HC and $NO_x$ in the exhaust gas can be greatly reduced.

While the invention has been described by reference to a specific embodiment chosen for purposes of illustration, it should be apparent that numerous modifications could be made thereto by those skilled in the art without departing from the spirit and scope of the invention.

What is claimed is:

1. A secondary air feed control device of an internal combustion engine having an intake passage and an exhaust passage equipped with a three way catalytic converter, said device comprising:
   means for detecting the total air-fuel ratio to provide a detecting signal indicating that the total air-fuel ratio is smaller than the stoichiometric air-fuel ratio;
   an air pump driven by the engine;
   a secondary air inlet opening into the exhaust passage located upstream of the three way catalytic converter; and
   valve means disposed in a second air passage communicating said air pump with said secondary air inlet for increasing the amount of the secondary air fed into the exhaust passage in accordance with increase in the level of the load of the engine and in response to said detecting signal when the total air-fuel ratio becomes smaller than the stoichiometric air-fuel ratio, said valve means comprises a first movable member, a first actuating device for actuating said first movable member in accordance with a change in the level of the load of the engine, a second movable member co-operating with said first movable member for defining a first opening connected to said secondary air inlet and a second opening connected to the atmosphere, and a second actuating device for actuating said second movable member in response to said detecting signal.

2. A secondary air feed control device as claimed in claim 1, wherein said first movable member is a valve seat member having valve ports and said second movable member is a valve head co-operating said valve ports, said valve head and said valve ports defining therebetween said first and second openings, the opening area of said first opening is increased in accordance with an increase in the level of the load of the engine and in response to said signal when the total air-fuel ratio becomes smaller than the stoichiometric air-fuel ratio.

3. A secondary air feed control device as claimed in claim 2, wherein said first and said second openings are arranged in tandem, said valve head being disposed between said first and second openings.

4. A secondary air feed control device as claimed in claim 1, wherein said first actuating device comprises a vacuum operated diaphragm apparatus having a vacuum chamber connected to the intake manifold.

5. A secondary air feed control device as claimed in claim 1, wherein said second actuating device comprises a vacuum operated diaphragm apparatus having a vacuum chamber connected to the intake passage via a vacuum conduit, a switching valve being disposed in said vacuum passage for selectively connecting said vacuum chamber with either the intake passage or the atmosphere in response to said detecting signal.

6. A secondary air feed control device as claimed in claim 5, wherein said switching valve is an electromagnetic valve.

7. A secondary air feed control device as claimed in claim 5, wherein an accumulator equipped with a pressure regulating valve is disposed in said vacuum passage located between said switching valve and the intake passage, a check valve being disposed in said vacuum passage located between said accumulator and the intake passage.

8. A secondary air feed control device as claimed in claim 1, wherein said first and said second actuating devices have stops for restricting the moving distance of said first and said second movable members, respectively, so that said first and said openings are not completely closed.

9. A secondary air feed control device as claimed in claim 1, wherein said detecting means is an oxygen concentration detector.

* * * * *